US009984127B2

(12) United States Patent
Bastide et al.

(10) Patent No.: US 9,984,127 B2
(45) Date of Patent: May 29, 2018

(54) USING TYPESTYLES TO PRIORITIZE AND RANK SEARCH RESULTS

(71) Applicant: International Business Machines Corporation, Armonk, NY (US)

(72) Inventors: Paul R Bastide, Littleton, MA (US); Matthew E. Broomhall, Goffstown, NH (US); Robert E. Loredo, Boca Raton, FL (US); Fang Lu, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 14/151,462

(22) Filed: Jan. 9, 2014

(65) Prior Publication Data

US 2015/0193506 A1 Jul. 9, 2015

(51) Int. Cl.
*G06F 17/30* (2006.01)

(52) U.S. Cl.
CPC .. *G06F 17/30525* (2013.01); *G06F 17/30946* (2013.01); *G06F 17/30976* (2013.01)

(58) Field of Classification Search
CPC ......... G06F 17/30525; G06F 17/30946; G06F 17/30976
See application file for complete search history.

(56) References Cited

U.S. PATENT DOCUMENTS

| | | |
|---|---|---|
| 5,224,206 A | 6/1993 | Simoudis |
| 6,167,369 A * | 12/2000 | Schulze ................ G06F 17/277 704/10 |
| 6,418,435 B1 | 7/2002 | Chase |
| 6,622,140 B1 | 9/2003 | Kantrowitz |
| 6,665,668 B1 * | 12/2003 | Sugaya ............. G06F 17/30011 707/730 |
| 6,701,294 B1 | 3/2004 | Ball et al. |
| 6,876,728 B2 | 4/2005 | Kredo et al. |
| 6,993,473 B2 | 1/2006 | Cartus |
| 6,999,914 B1 | 2/2006 | Boerner et al. |

(Continued)

FOREIGN PATENT DOCUMENTS

| | | |
|---|---|---|
| JP | 2007115161 | 5/2002 |
| WO | 2002041191 | 5/2002 |
| WO | 2009021198 | 12/2009 |

OTHER PUBLICATIONS

Garner, David; "How do different langauges convey shades of meaning as english does with stress?", StackExchange; https://english.stackexchange.com/questions/232001/how-do-different-languages-convey-shades-of-meaning-as-english-does-with-stress.*

(Continued)

*Primary Examiner* — Amanda L Willis
(74) *Attorney, Agent, or Firm* — Robert H. Frantz; David B. Woycechowsky

(57) ABSTRACT

Computer-based search results are improved by taking in consideration emphasized content by extracting content of a data corpus items indicated by typestyle emphasis; indexing the extracted emphasized content in the searched corpus; in response to a natural language query from a requester, performing a search such as a deep question and answer search of the corpus including the indexed emphasized content; and producing search results to the requester from the corpus with preference in the order or presentation of the results according to the emphasized content.

13 Claims, 5 Drawing Sheets

(56) References Cited

U.S. PATENT DOCUMENTS

| | | | |
|---|---|---|---|
| 7,058,567 | B2 | 6/2006 | Ait-Mokhtar |
| 7,110,937 | B1 | 9/2006 | Lei et al. |
| 7,346,487 | B2 | 3/2008 | Li |
| 7,680,646 | B2 | 3/2010 | Lux-Pogodalla et al. |
| 7,693,705 | B1 | 4/2010 | Jamieson |
| 7,869,987 | B2 | 1/2011 | DeMarco |
| 2002/0059220 | A1 | 5/2002 | Little |
| 2002/0161796 | A1* | 10/2002 | Sylthe ............... G06F 17/30905 715/234 |
| 2002/0169595 | A1 | 11/2002 | Agichtein et al. |
| 2003/0144831 | A1 | 7/2003 | Ford |
| 2004/0117189 | A1 | 6/2004 | Bennett |
| 2004/0167769 | A1* | 8/2004 | Becker ............... G06F 17/2223 704/3 |
| 2005/0137723 | A1 | 6/2005 | Liu et al. |
| 2005/0138538 | A1 | 6/2005 | Raguseo |
| 2005/0160107 | A1 | 7/2005 | Liang |
| 2005/0260549 | A1 | 11/2005 | Feirerstein et al. |
| 2006/0224554 | A1* | 10/2006 | Bailey ............... G06F 17/30864 |
| 2008/0065607 | A1* | 3/2008 | Weber ............... G06F 17/30616 |
| 2008/0102856 | A1* | 5/2008 | Fortescue .............. G06Q 30/02 455/456.1 |
| 2011/0270607 | A1 | 11/2011 | Zuev |
| 2012/0246173 | A1* | 9/2012 | Wittmer ............ G06F 17/30991 707/749 |
| 2013/0218914 | A1 | 8/2013 | Stavrianou |

OTHER PUBLICATIONS

Allen, James F., et al., "Deep Semantic Analysis of Text", retrieved on Oct. 27, 2012 from http://aclweb.org/anthology-new/W/W08/W08-2227.pdf.
Wikipedia; "Smith-Waterman algorithm"; retrieved from http://en.wikipedia.org/wiki/Smith-Waterman_algorithm on Feb. 5, 2013.
Linkspringer; "Linguistic and Semantic Representation of the Thompson's Motif-Index and Folk-Literature"; Retrieved on Aug. 28, 2013 from http://link.springer.com/chapter/10.1007/978-3-642-24469-8_17.
Ait-Mokhtar; "Robustness beyond Shallowness:Incremental Deep Parsing"; Retrieved on Aug. 28, 2013 from http://pageperso.lif.univ-mrs.fr/~edouard.thiel/RESP/Semi/2006/ROUX/idp.pdf.
McCarty, L. Thorne, "Deep Semantic Interpretations of Legal Texts",retrieved on Nov. 27, 2012 from http://remus.rutgers.edu/cs440/icail07-acm.pdf.
Maggiani, R.; "Method for Customizing Queries Based on User Preferences for Searching Online Content and Returning Customized Results"; published by IP.com, Feb. 10, 2009.
Ferrucci, D.; "Building Watson; An Overview of the DeepQA Project"; retrieved on Nov. 11, 2011 from http://www.stanford.edu/class/cs124/AIMagzine-DeepQA.pdf.
IBM; "High Throughput Computing on IBM's Blue Gene/P".
IBMResearch; "DeepQA Project FAQ's"; retrieved on Sep. 13, 2011 from http://www.research.ibm.com/deepqa/faq.shtml.
IBM; " IBM System Blue Gene/P Solution".
Farlex; definition of "Diacritical Mark", retrieved on May 9, 2016 from http://www.thefreedictionary.com/diacritical+mark.
Cambridge English Dictionary; definition of "emphasis" retrieved on May 9, 2016 from http://dictionary.cambridge.org/us/dictionary/english/emphasis.
DICTIONARY.COM ; definition of "diacritic", retrieved on May 9, 2016 from http://www.dictionary.com/browse/diacritic.
How Stuff Works; "What are TrueType fonts?", retrieved on May 9, 2016 from http://computer.howstuffworks.com/question460.htm.
Nakilcioğlu, I. H.; "The Effect of Font Type Choosing on Visual Perception and Visual Communication", Online Journal of Art and Design, vol. 1, Issue 3, 2013.
Girard, J.; "Visual color symbolism chart by culture; what different colors mean in different cultures"; retrieved on Jan. 16, 2017 from http://webdesign.about.com/.
Practical Typography; "Butterick's Practical Typography"; retrieved on Jan. 16, 2017 from http://practicaltypography.com/bold-or-italic.html.
Bulat, A.; "Font Psychology: What Your Font Says About Your Website", retrieved on Jan. 16, 2017 from https://www.templatemonster.com/blog/font-psychology/.
Pepper, Hurm, and Brizee; "Using Fonts with Purpose", Purdue University Online Writing Lab (OWL); retrieved on Jan. 16, 2017 from https://owl.english.purdue.edu/owl.
Sorkin, E.; "The Voices of Type"; http://typecast.com/blog; Mar. 20, 2014.

* cited by examiner

USING TYPESTYLES TO PRIORITIZE AND RANK SEARCH RESULTS

FIELD OF THE INVENTION

This invention relates generally to methods, systems, computer program products and automated processes for using typestyle and extended font characteristics to rank and prioritize results of a question-and-answer search using Natural Language Processing.

BACKGROUND OF INVENTION

In document publishing, typestyles including, but not limited to, different font sizes, font colors, highlighting, italicization, underlining, and strikethrough indicate different meanings and tones for the reader's interpretation that extend beyond the text words and sentences themselves. Different cultures have different ways to mark emphasis in desktop publishing, for example.

Consider the three statements, which are composed of the same words and sentence structures, but two of which include additional information conveyed by italicization:
  We were eating apples. (plain statement, no further information)
  We were eating apples. (... and not some other fruit)
  We were eating apples. (... but not now)

Most cultures have similar ways of conveying additional emphasis, and in some cases, the context of the text may also play a part in what methods of emphasis are available. For example, in Short Message Service (SMS) or "text messaging" services, there is no typestyle functionality, just plain text. So, the foregoing example may appear with ad hoc emphasis as follows:
  We were eating apples. (plain statement, no further information)
  We were eating APPLES. (... and not some other fruit)
  We *were* eating apples. (... but not now)

Here, society has made use of all capitalization (e.g. all upper case font) and bracketing with asterisks to convey some additional information beyond the simple, plain text message.

SUMMARY OF THE INVENTION

Computer-based search results are improved by taking in consideration emphasized content by extracting content of a data corpus items indicated by typestyle emphasis; indexing the extracted emphasized content in the searched corpus; in response to a natural language query from a requester, performing a search such as a deep question and answer search of the corpus including the indexed emphasized content; and producing search results to the requester from the corpus with preference in the order or presentation of the results according to the emphasized content.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

Figure 1A:
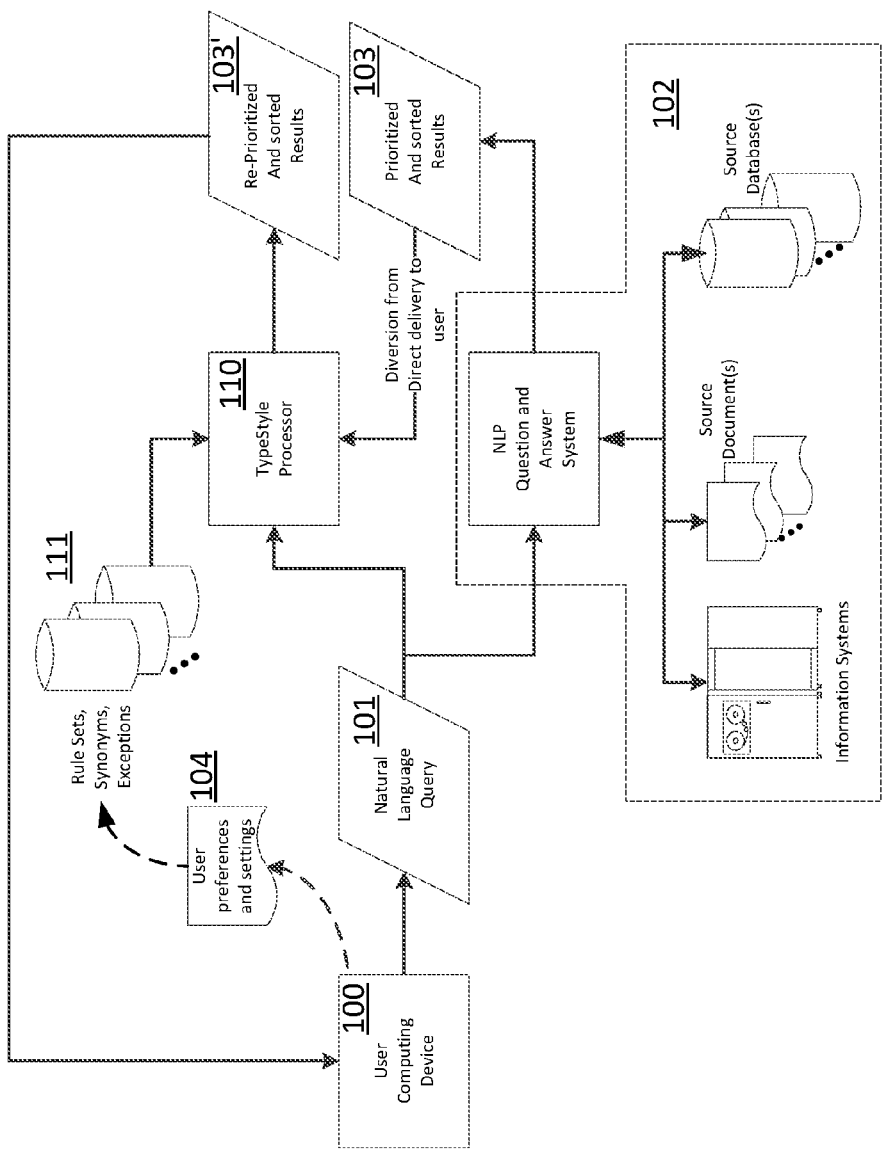
FIGS. 1a and 1b depicts two embodiment options of the present invention for integration to or cooperation with a search engine system.

The present inventors have recognized a problem in the art that appears to be unrecognized and unsolved by those skilled in the art relating to input and output of common search engines as well as for advanced search engines such as deep Question and Answer (deep QA) search engines. The foregoing emphasis in text as conveyed by typestyles, whether it is part of a query string input into a search engine or it is part of the textual findings (the search results), is ignored. In fact, the technology of the existing art teaches away from considering this information by ignoring and stripping from text these typestyle indicators.

For example, if one is to go to a Google™ search page, and type a search string into the search box, one will find no functionality to add bold, italics, or underlining to the input string. If one tries to be clever and create such a string with typestyle-based emphasis in another program, such as Microsoft Word™, and then to cut-and-paste that string with emphasis into the Google ™ search input box, one will be disappointed when the text is placed in the box without any special emphasis formatting.

Likewise, the results of search operations do not place any greater weight or ranking priority on result items which contain emphasized text relevant to the search query. Even though the publisher of a document may convey special emphasis within a page or document by using typestyle indicators, search engines do not use that information to rank the document or page higher or lower in the results.

The inventors have recognized this problem in the art, e.g. that valuable information conveyed in typestyle meta-data is being ignored, information which could be used to improve search results at the input, at the output, or both. Because emphasis using typestyles is related to natural language, the present invention is set forth in terms of enhancements in and cooperation with a deep QA natural language processing system, but it should be understood by those skilled in the art that such enhancements may be beneficial to other types of search engines as well.

Survey for an Existing Solution

Initially, the present inventors looked for an existing solution for this problem. Having found no suitable solution, and found no suggestion that anyone in the art has recognized this lost information in both search engine queries and search engine results, the present inventors set out to develop a new system, a method and computer program product, all of which are disclosed in the following paragraphs in particular detail.

Deep Semantic Analysis of Natural Language Text in General

Deep QA search engines employ analysis which detects deep semantic relationships between terms and phrases within a document, web page, or other textual sources, to beyond simple search term (key) finding and frequency of occurrence ranking. The term "deep semantic relationships", for the purposes of the present disclosure, is meant to refer to relationships between information entities in a given context and how they relate to each other. They can be the occurrence of triple store terms or entities or they can be the occurrence with a relationship of those entities. For example, (Mutation, Cancer, Organ) would be a semantic relationship, identifying that mutations, cancer and specific organ ontologies have a deep relationship. Further, a deep semantic analysis system sometimes associates a specific relationship (mass, ?indicates, metastasis), where the combination and synonyms for "indicates" would mean the cancer has metastasized.

The term deep semantic relationship may also refer to the relationship of terms in a specific ontology and their similarity when expressed in passages of text based on the how they are typically expressed using sequence matching algorithms for text analysis. For example, the well-known Smith-Waterman sequence-matching algorithm measures the lengths of the longest similar subsequence between two texts, which is then a measured or detected semantic relationship between those texts.

Deep semantic relationships consider the meaning of words within the context and structure of a sentence. They signify a "deep" understanding the meaning of words that comprise a relationship within the sentence. Deep semantic relationships are usually developed with a very specific use case in mind. For example, consider the sentence "John bought bread at the store." From this, a relationship like sold(store, bread) may be mined, indicating that the store sold bread. This relationship requires a deep understanding of what a store is (a retailer that sells consumable goods) and that bread is one of those items.

For example, one "specific use" in which deep semantic analysis has been proposed is the deep semantic interpretations of legal texts as proposed by L. Thorne McCarty of Rutgers University (Association of Computer Machinery (ACM), 971-1-59593-680). Another useful publicly-available document regarding realization of a general purpose automatic deep semantic analyzer of natural language text is described in "Deep Semantic Analysis of Text" by James F. Allen, et al., of the University of Rochester and the Institute for Human and Machine Cognition (document W08-0227 from the ACL).

So, while deep semantic analysis of natural language text in general has been discussed in the public domain, the inventors have discovered that the aforementioned problem of making an automated analysis of one or more works of literature, those presently engaged in the art appear to be focused on keyword searching and relevance ranking according to keywords. One approach to advancing beyond keyword searching is "intent-centric" processing as proposed by Scott Brave, et al., in WIPO patent application WO 2009/021198 A1. Inventors do not believe this approach, however solves the present problem because it addresses a different problem using a different approach without employing deep semantic analysis.

The present invention is set forth in at least one exemplary embodiment as an application of or manner of using a deep semantic analyzer platform. This platform may be a system such as the IBM Watson™ system, such as is described in "Building Watson: An Overview of the DeepQA Project" (Stanford University online, and AI Magazine, Fall 2010 issue). The foundation deep semantic analysis platform may be an alternate general-purpose deep semantic analyzer implementation such as the semantic extraction component of the system described by Anna Stavrianou in United States Pre-Grant Published Patent Application 2013/0218914 A1 (Aug. 22, 2013) suitably modified to include the functionality of the related, incorporated patent application and that described herein by the present inventors. Other useful, publicly-available teachings regarding the availability of general purpose deep semantic analyzers which may be suitable for adapting and improving to the present invention may include those described by Konstantin Zuev in United States Pre-Grant Published Patent Application 2011/0270607 A1 (Nov. 3, 2011); the Thompson's Motif-Index Literature system of Thiery Declerk, et al., as published in "Research and Advanced Technology for Digital Libraries: Lecture Notes in Computer Science", vol. 6966, 2011, pp. 151-158; and using natural language parsers such as that described by Sala Ait-Mokhtar, et al., in U.S. Pat. No. 7,058,567 (Jun. 6, 2006).

One may contrast deep semantic relationships with shallow semantic relationships, that latter of which usually only consider the structure of parts of speech within a sentence, and not necessarily the meanings of those words. An example shallow relationship may simply be of the form sentence(subject, verb, object). In the above example, this would be sentence(john, bought, bread). These terms don't signify any special meaning, but their parts of speech form a shallow relationship called "sentence".

Graphical logical forms for representation of text can be created using one of several known methods, such as that proposed by James F. Allen, Mary Swift, and Will de Beaumont, of the University of Rochester and the Institute for Human and Machine Cognition (Association for Computer Linguistics (ACL), anthology document W08-2227).

Emphasis Indication via Typestyle and Shifts in Typestyle

For the disclosure of the present invention and the several exemplary embodiments, we will use the term "emphasized typestyle" to refer to elements of typography which effect the appearance of a word, character or symbol, that imparts some culturally understood emphasis (or extended meaning) beyond that conveyed by a non-emphasized ("plain") typestyle. In English, this may be bolding or italicization of a word in the same font as the rest of a phrase or sentence, and it can mean the use of a different type face from the rest of the phrase or sentence in which it appears, such as:

This sentence is in Arial type face, and bolding shows emphasis.

Or:

This sentence is in Arial type face, and Times Roman font face shows emphasis.

In other languages, other typestyle indicators may be employed to convey emphasis. For example, to emphasis a part of a sentence in Mandarin Chinese, that part is preceded by shi (是), and followed by with de (的). In Modern Standard Arabic (MSA) script, capitalization (upper case) is rare, but capitalization can be used to show emphasis, as can underlining a character or placing a dot (a diacritical mark) below the character.

In some language encoding schemes, typestyle application is straightforward to detect, such as in eXtendable Markup Language (XML). In XML, there is an opening tag and a closing tag which shifts the rendering of a phrase, word or character from the default rendering, so a bolded word "apple" may be coded in XML as <bold> apple </bold>, for example. Other character encoding schemes such as Unicode allow for more complex diacritical changes to the appearance of characters, such as striking over one character with a second character, which can also be analyzed to find any typestyle shifts which culturally indicate emphasis.

In many, but not all, situations, it is actually a shift in typestyle from the "normal" typestyle of the rest of the text which shows emphasis. For example, if a paragraph is entirely written in non-bold text, but only a few words of the paragraph are bolded, then the shift from non-bold to bold (and back again) forms a bracketing around the bold text to emphasis it. If, however, the entire text was conveyed in bolded text, then bold typeface may not be an emphasis indicator, unless the paragraph is part of a larger document which conveys most its text in non-bolded typestyle. If the latter is true, then the entire bolded paragraph may be emphasized relative to the rest of the text of the document.

Similarly, changes in font face (e.g., Arial to Times Roman and back to Arial), font size (e.g., increasing of size of text and then decreasing of size of text), and changes in color of text (e.g. changing from black text to red text and back to black text) are other well-known means of typestyle shifts to indicate emphasis.

So, by "typestyle shift", we will collectively refer to changes in typestyle from a normal or non-emphasized typestyle, typically referenced to surrounding text. We may also use "typestyle shift" to refer to culturally-known typestyle indicators which convey emphasis without any surrounding "normal" text, such as the now-dropped HTML "blink" tag (replaced by cascading style sheet formatting).

"White space" may also be used to indicate emphasis, or de-emphasis (e.g. subordination). For example, in generalized English, an author may use indentation (e.g. increased white space between the left margin and the beginning of a text line) to indicate subordinate clauses, examples, or species within a genus. One might pose a natural language question in which tabs or indentation create additional left-margin white space to show examples (species) of a larger class (genus) or logical conditions, as such:

What are the ways to pay for college that:
do not include borrowing,
are available to young people with no prior work experience, and
provide a reasonable rate of pay.

In the second element ("available to people with no experience"), a hanging indentation provides even more white space between the left margin and the beginning of the text to denote second and subsequent lines of text belong with the first line of text of the second element. Such use of white space, page layout, text placement, and alignment (tables, columns)—can also be used to provide emphasis or de-emphasis, depending on the context of the script and the cultural norms from which the text is drawn.

Embodiments of the present invention may detect any or all of these emphasis designations which are encoded in digital representations of text (e.g., ASCII, UniCode, XML, HTML, etc.), and which cause a human reader to perceive a typestyle indication of emphasis when the digital representation is converted or processed to a human-readable output device such as a printer or computer screen using a rendering language or process (e.g. Printer Control Language (PCL), Hewlett-Packard Graphics Language (HPGL), PostScript, an API to a graphics processor, etc.).

Overview of Present Invention

Methods and systems according to the present invention enhance the use of typography information in search engines, especially in question and answer systems, by:

1—Loading Data with the typography metadata of the text which includes font family, font size, color coding, emphasis symbols and etc. when ranking the search results.

2—Preprocessing each data element to assign a unique identifier to lookup the corresponding typography metadata.

3—Generating a Model from the Loaded Data taking into account the typography factors.

The advantages of the invention include improving the processing of data into text mining systems, and enhancing search engines and especially Question and Answer Systems such as IBM's Watson™ and similar QA systems.

Intended User Experience

Prior to discussing the exemplary embodiments of the invention, we disclosed the intended user experience respective to a QA search on a system such as IBM's Watson:

1. User logs into Q/A System.
2. Optionally, the user chooses the set of data (corpus) to be loaded or searched.
3. The user inputs question in natural language format. Example "what are the treatments for high cholesterol?"
4. The enhanced QA System analyzes the question using NLP.
5. The enhanced QA System searches the corpus and discovers a set of search results.
6. The enhanced QA System assigns each data element in the corpus (e.g. the data to be searched) a unique identifier to lookup the corresponding typography metadata. From the search results:
   a. The enhanced QA System extracts font family, font size, and font color information from each document from search results.
   b. The enhanced QA System extracts additional emphasis sign information from each data item (documents, pages, database records, etc.) from the search results, based on each data item's origin and language.
   c. The enhanced QA System extracts the location of the document origin information from each document from search results.
   d. The enhanced QA System generates a Model from the Loaded Data (corpus) taking into account the typography factors. This model contains the data extracted from the steps above.
7. The enhanced QA System ranks the search results based on the typography data and derives which data is the most relevant to the question.
8. In the answer returned, the text can contain bold font and plain font. Some of the texts are underlined. The system also identifies the origin of the text was composed from a document published within the United States. For the above example Natural Language Query (NLQ), nine search results (R1-R9) may appear with typestyles as follows:

R1="Eating better"
R2="Statin drug"
R3="Bile acid resins like Colestid, Lo-Cholest, Prevalite, Questran, and WelChol. They stick to cholesterol in the intestines and prevent it from being absorbed. They can lower LDL cholesterol by 15-30%."
R4="Ezetimibe (Zetia) blocks some of the cholesterol from being absorbed by your body. It can lower LDL levels by 18-25%."
R5="Maintaining (or losing) weight is recommended as a first step towards improving cholesterol levels . . . "
R6="Exercising more"

R7="Fibric acid like Antara, Atromid, Lopid, and Tricor. They reduce your triglycerides and may give a mild boost to your HDL."

R8="Niacin, available as Niacor, Niaspan, and Nicolar. Niacin modestly lowers LDL cholesterol and triglycerides and can raise HDL cholesterol at low doses. LDL levels are usually cut by 5-15%."

R9="A combination medicine like ezetimibe with simvastatin (Vytorin) which uses a statin to block production of cholesterol and ezetimibe to prevent cholesterol from being absorbed."

9. The enhanced QA System interprets that bold fonts and underlined text are clear signs of emphasis in a text published in the United States, and uses that information as an additional factor to weigh and rank the search results.

10. The enhanced QA System normalizes font attributes to prioritize the loading of document data.

11. The enhanced QA System presents a confidence level of each of the data items in the search results. For this example, the search results data items R1, R2, R5 and R6 ("Eating better", Maintaining (or losing) weight, "Exercising more, Statin") are assigned with the highest rank in the search results due to the emphasis in their typestyles. The results are re-prioritized, re-ordered or re-ranked for presentation to the user as follows:

"Eating better"
"Statin drug"
"Maintaining (or losing) weight is recommended as a first step towards improving cholesterol levels . . . "
"Exercising more"
"Bile acid resins like Colestid, Lo-Cholest, Prevalite, Questran, and WelChol. They stick to cholesterol in the intestines and prevent it from being absorbed. They can lower LDL cholesterol by 15-30%."
"Ezetimibe (Zetia) blocks some of the cholesterol from being absorbed by your body. It can lower LDL levels by 18-25%."
"Fibric acid like Antara, Atromid, Lopid, and Tricor. They reduce your triglycerides and may give a mild boost to your HDL."
"Niacin, available as Niacor, Niaspan, and Nicolar. Niacin modestly lowers LDL cholesterol and triglycerides and can raise HDL cholesterol at low doses. LDL levels are usually cut by 5-15%."
"A combination medicine like ezetimibe with simvastatin (Vytorin) which uses a statin to block production of cholesterol and ezetimibe to prevent cholesterol from being absorbed."

12. In systems suitably equipped with learning functionality, such as the IBM Watson system, the user reviews the presented search results, and then indicates satisfaction or dissatisfaction with the answer, such as by an overall satisfaction level of all the items in the results or even by individual indicators of satisfaction with each item within the search results (e.g., find more like these results, and find less like these results). Such information is then used to "learn" from the user, which can be used to further enhance the next search presentation of the same or a similar question to the same user or to other users. In some learning search engines, each user has a stored profile or history which records his or her satisfaction ratings so that searches can be tailored to his or her language and preferences. In yet some other learning search systems, such learned satisfaction feedback can be aggregated over multiple users and employed during searches for other users, thereby achieving something akin to a community-based preference profile.

First Exemplary Embodiment

Referring now to FIG. 1a, a first exemplary embodiment in which input to a NLP search engine (QA search engine) output (search results) are re-prioritized according to typestyle-emphasized text found in the output, and optionally corresponding to typestyle-emphasized text in the original query.

A user of a computing device (100) (or a client process) submits a natural language query (NLQ), which may contain (or may not) typestyle-emphasized words or phrases. The NLQ (101) is submitted to a NLP QA system (102), and optionally is received by the Typestyle Processor (110) enhancement according to the present invention. The NLP QA system (102) searches its corpus of information (database records, documents, web pages, APIs to information systems, etc.), and returns (103) what is considered the most relevant results without consideration of typestyle-emphasized text in the search results (e.g. normal search results).

The Typestyle Processor (110) intercepts those results (103) prior to delivery to the requester (100), and analyzes them as previously discussed using rule sets, synonym lists, thesauri, exception rules (111), and optionally one or more user preferences (104). These (111, 104) allow the Typestyle Processor (110) to detect the native language in which the results are expressed, and optionally the language of the NLQ. Based on the native language detection, one or more cultural rules may be retrieved which indicate how emphasis is made in that language using typestyles (e.g. bolding, italicization, capitalization, diacritical marks, framing with special characters, etc.). The Typestyle Processor then evaluates the results (103) from the NLP search, and assigns confidence scores which are increased by finding emphasized words and phrases within the results (103) which are relevant to the NLQ. For additional accuracy, the NLQ may also be evaluated to find emphasized words and phrases, which are used to further increase the confidence levels of each item in the search result which is relevant to those emphasized words, phrases and terms.

The results (103) are then re-sorted, re-ranked, and re-prioritized according to their initial relevance and further according to the confidence levels created from the typestyle emphasis consideration. These re-sorted, re-ranked, or re-prioritized results (103') are then delivered to the requester (100), be it a client device or another computing process.

It should be noted that the NLP QA system (102) may be the IBM Watson™ system, but it may also be a suitable alternative QA system that supports natural language processing. It should also be noted that such NLP searching may be invoked remotely, such as via a cloud-based service, and as such, FIGS. 1a (and 1b) do not imply direct or native integration with such an NLP searching system.

Second Exemplary Embodiment

Figure 1B:
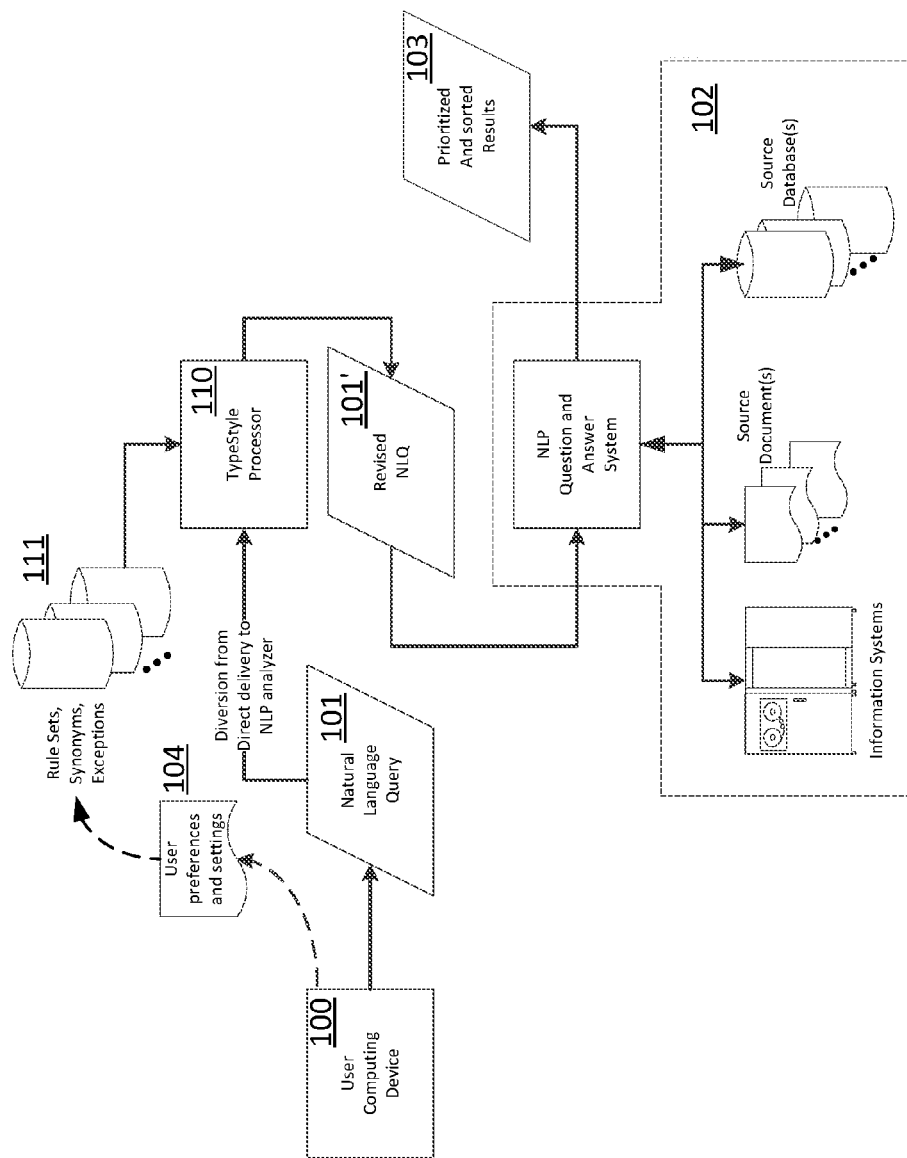

Referring now to FIG. 1b, an alternative embodiment according to the present invention is shown. In this embodiment, rather than modify the NLP search results according to typestyle emphasis evaluation, the query itself (101) is modified according to typestyle emphasis analysis to cause the NLP search results to be prioritized and ranked with the emphasis in consideration. The modified NLQ (101') is submitted to the NLP system (102) instead of the unmodified NLQ (101).

For example, consider a NLQ from a requester as follows with the italicized emphasis:

"What are the best ways to discipline a child without *spanking*?"

Here, the language is Generalized English, which can be detected from the vocabulary and sentence structure. Child discipline is detected as the object of the query, and because English speakers often use italics typestyle to convey emphasis, it is determined that results avoiding spanking are to be raised in priority or rank, while results including spanking are to be lowered in priority or ranking. So, rather than submitting the original (unmodified) NLQ to the NLP search system, the NLQ is modified to read as follows:

"What are the best ways to discipline a child with strong preference on methods other than spanking."

The added wording to this modified NLQ will cause the NLP system (102) to rank the results without spanking even higher than it would have with just the phrase "without spanking".

Detailed Logical Process Embodiment

Figure 2:
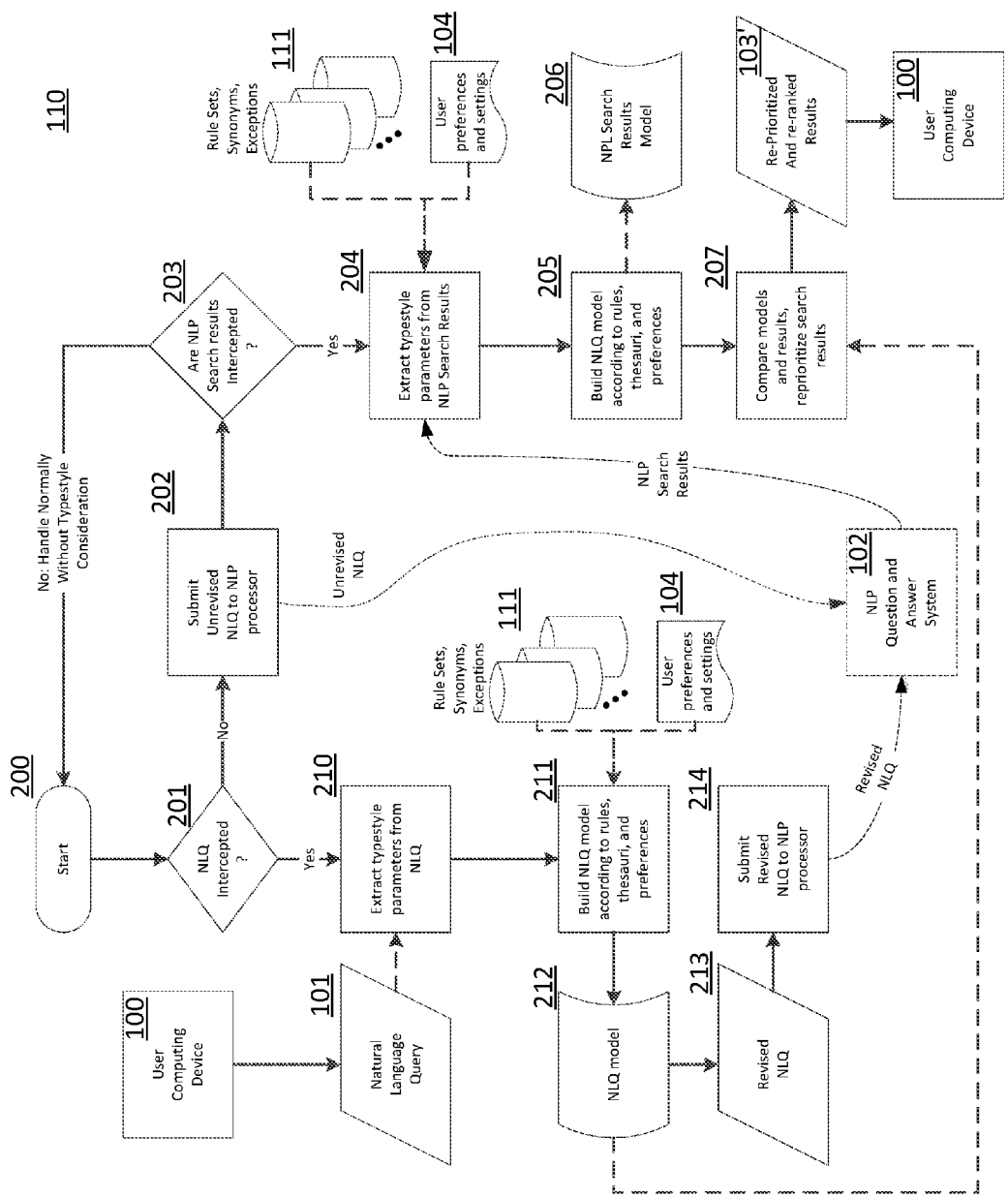
FIG. 2 provides more details of a logical process according to the present invention.

In FIG. 2, a more detailed view of a logical process is shown of at least one embodiment of the Typestyle Emphasis Processor (110), suitable for realization as a combination of computer program product, program instructions, computer processors, with or without specialized integrated circuits to perform some or all of the logical operations.

This embodiment starts (200) by determining if the NLQ is to be intercepted (201). If so, then typestyle information is extracted (210) from the NLQ (101). A model (212) is built (211) representing the emphasis contained within the original NLQ, and then the NLQ is revised (213) per that model (212) to place additional natural language constraints into the NLQ which is submitted to the NLP search engine (102). If the NLQ is not to be revised, then the original NLQ (101) is submitted to the NLP search engine (102).

After the NLP search engine results are intercepted (203), typestyle emphasis information is extracted (204) from the search results, and model (206) is built representing the emphasis found in each data item (e.g. documents, pages, database records, etc.) of the search results. Finally, the one or two models (212, 206) are compared to the search results, and confidence factors are assigned to each data item, wherein confidence is enhanced by the matching emphasis found, and reduced (or left neutral) for lack of emphasis. Then, the results of the search are re-prioritized (103') according to the emphasis-driven confidence factors, and those re-ranked results are provided to the requester (100).

Specific Examples of Operation

It is useful for understanding an invention to review several examples of operation and usage, wherein the examples are not intended to illustrate the full scope or bounds of the various possible embodiments of the present invention. Bearing that in mind, we refer to FIG. 3 in which three examples of operation an embodiment of the invention are illustrated.

Consider first a received query (101*a*) of "what are the different ways to handle high cholesterol?". The logical process as set forth in previous paragraphs would detect the language of the NLQ as being American English from sentence structure, vocabulary, and the American English colloquialism "ways to handle". It would also, from its rules and lists, note that "cholesterol" is a species of genus "illness" or genus "disease", a would determine that "different" suggests the user is looking for variety. There no restriction as to source of treatment desired (eg. hospital, clinic, doctor, health food, dietary supplement, etc.), and there appears to be no preference for regional distinctions (e.g. Eastern medicine, Western medicine, etc.). Having built the model for emphasis found in the NLQ (none), the NLP search results are received which are, in this example, initially prioritized by most popular or most common treatments that anyone (folk medicine, homeopathy, MDs, eastern, etc.) may use for high cholesterol:

(1) diet,
(2) exercise, and
(3) statin drugs.

Now consider that those three "most popular" results contain one result, statin drugs, which includes emphasis on the text in its source document or page. So, a higher confidence level would be assigned to this result data item, and the search results would be re-ranked (103') and provided to the requester as:

(1) statin drugs,
(2) diet, and
(3) exercise.

Now, consider a second NLQ (101*b*) of "what do doctors do about high cholesterol?", in which the NLQ contains emphasis on the word "doctors" (bolding in this example). Because there are not regional colloquialisms in this NLQ, the vocabulary and sentence structure would be classified as Generalized English. And, "treatment" would be found in a synonym list with "cure", "remedy", "therapy", "regimen", "protocol", etc. Because bolding is known to be a way of indicated emphasis in Generalized English script, the embodiment of the invention may optionally modify the NLQ to further specify preference for doctor-prescribed or doctor-administered remedies before submitting the NLQ to the NLP search engine. And, upon receipt of the search results, the model of the results (and optionally of the revised NLQ) is used to re-rank them according to confidence factors that they are administered or performed by a doctor as follows, which are notably different that those provided in the first example (101*a*):

(1) niacin compounds,
(2) statins, and
(3) surgery (stints, arterial transplants).

Figure 3:
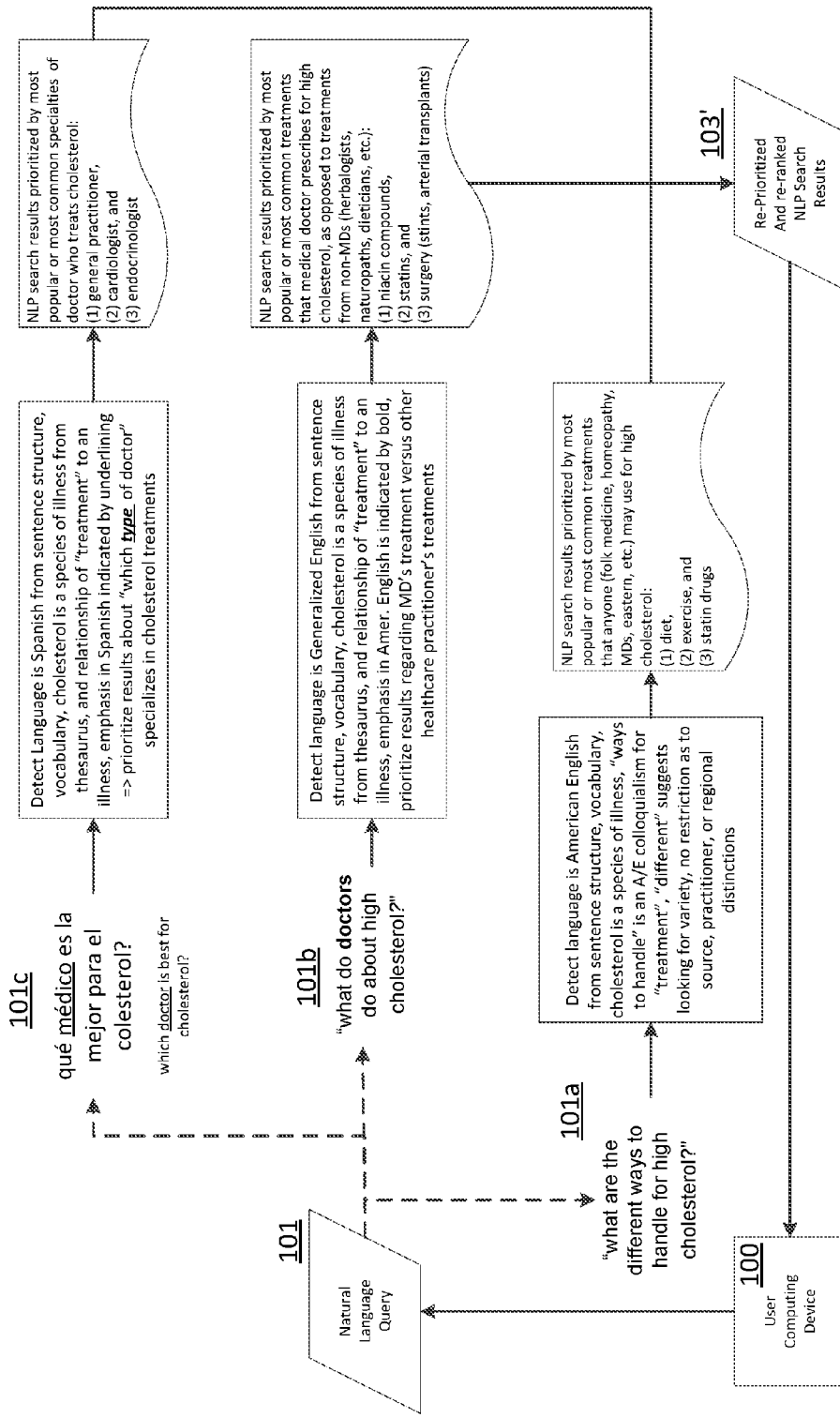
FIG. 3 illustrates three examples of operation, and varying results based on different languages and different emphasized content.

In a third example shown in FIG. 3, an NLQ expressed in Spanish (101*c*) is received, which translates to English "which doctor is best for cholesterol?", which an underlining emphasis on "médico" (doctor). The base language would be detected as Spanish due to the vocabulary and sentence structure, and the underlining of "médico" is known to be a method in Spanish script of adding emphasis. However, unlike the analysis of the second example (101*b*) NLQ which also seemed to emphasize the word doctor, the NLP analysis will detect the word "which" prior to the emphasized "médico", and will determine that the user is interested in all the types or varieties of doctor specializations, not treatments, who handle cholesterol maladies. So, the NLP search results, which are initially in most popular or most frequently-appearing order, are re-prioritized by the most common or relevant practice specialties of doctors who treat cholesterol maladies:

(1) general practitioner (médicoamédica de medicina general),
(2) cardiologist (cardiólogo), and
(3) endocrinologist (endocrinólogo).

Please note that these top three results are radically different than the top three re-prioritized results of the other two examples, which illustrates the usefulness and improved accuracy of embodiments of the invention.

Computer Program Product

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the Suitable Computing Platform The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 4:
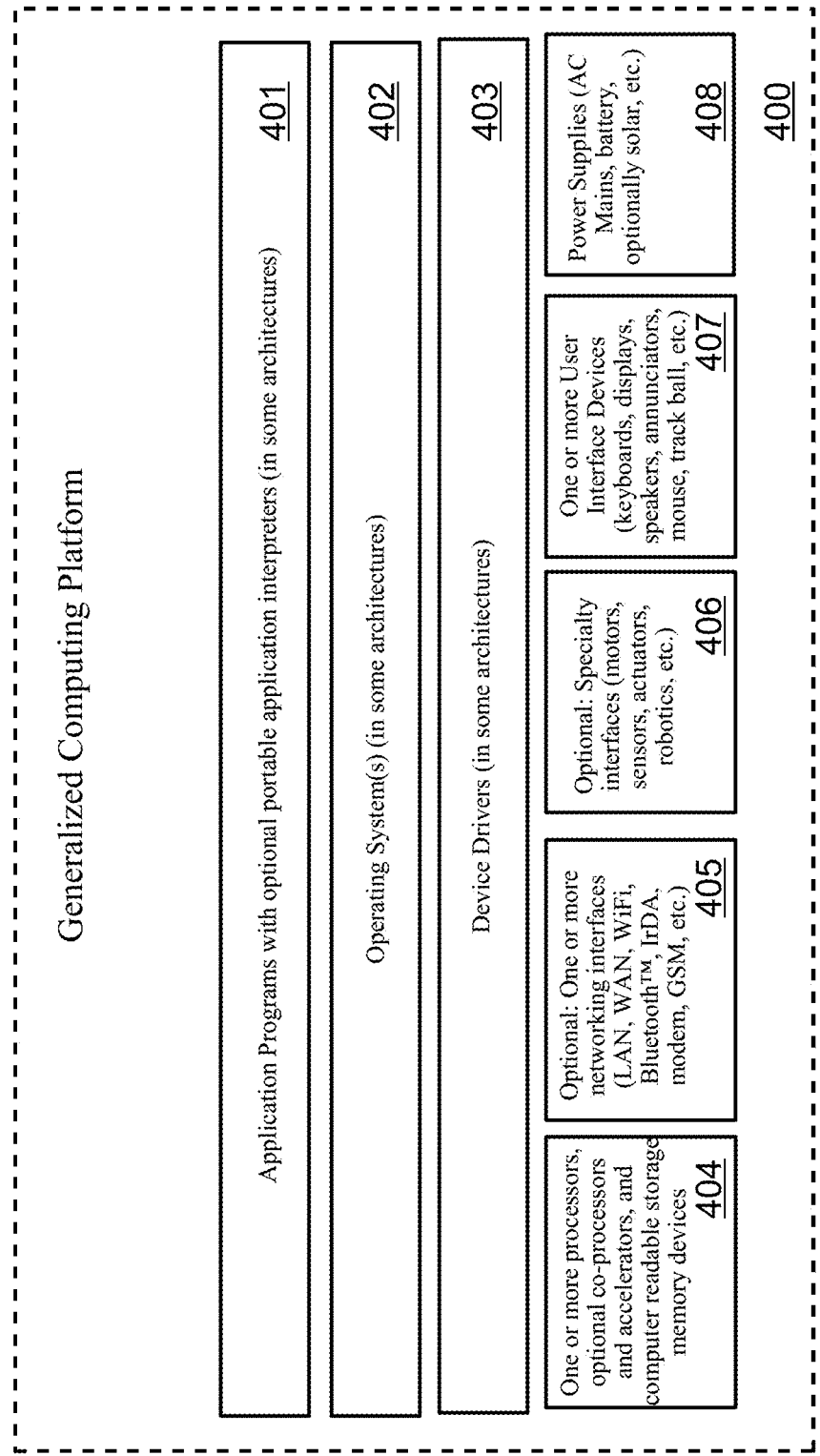
FIG. 4 sets forth a generalized computing platform suitable for combination with program instructions to perform a logical process to yield a computer system embodiment according to the present invention.

The present invention may be realized for many different processors used in many different computing platforms. FIG. 4 illustrates a generalized computing platform (400), such as common and well-known computing platforms such as "Personal Computers", web servers such as an IBM iSeries™ server, and portable devices such as personal digital assistants and smart phones, running a popular operating systems (402) such as Microsoft™ Windows™ or IBM™ AIX™, UNIX, LINUX, Google Android™, Apple iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (401) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (404) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (405) may be provided, as well as specialty interfaces for specific applications. If the computing platform is intended to interact with human users, it is provided with one or more user interface devices (407), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. An automated method for improving search results in consideration of emphasized content comprising:
    prior to delivery to a user, intercepting natural language results from a search performed using a natural language query;
    detecting, by one or more processors, a natural language in which the results are expressed;
    retrieving according to the detected natural language, by the one or more processors, from a database, a cultural rule indicating how emphasis of words and sub-phrases is made using a shift from a default text typestyle to an emphasized text typestyle, wherein the shift occurs for one or more words in a phrase and the phrase is otherwise encoded in the default text typestyle, and wherein the emphasized text typestyle is selected from the group consisting of bolding, underlining, strikethrough, color and italicization;
    finding, by the one or more processors, using the cultural rule, one or more emphasized words in the results;
    assigning, the one or more processors, confidence scores to each result according to occurrences of found emphasized words relevant to the query;
    re-ranking, by the one or more processors, the results according to an initial relevance and according to the confidence scores; and producing, by the one or more processors, to the user, the re-ranked results.

2. The method as set forth in claim 1 wherein the producing of the results further comprises annotation of the results to reflect the detected emphasized one or more words.

3. The method as set forth in claim 1 further comprising:
    revising the natural language query to expound on the one or more emphasized words in the results; and
    performing a deep question and answer search of the corpus using the expounded natural language query.

4. The method as set forth in claim 1 further comprising:
    subsequent to the presentation of results, receiving by a computer at least one user satisfaction indicator regarding the results; and
    employing by a computer the satisfaction indicator in a subsequent search to improve search accuracy relative to preferred and non-preferred past results.

5. A computer program product for improving search results in consideration of emphasized content comprising:
    a tangible, computer-readable storage memory device excluding a propagating signal; and
    one or more program instructions embodied by the memory device for causing a processor to perform operations comprising:

prior to delivery to a user, intercepting natural language results from a search performed using a natural language query;

detecting a natural language in which the results are expressed;

retrieving, according to the detected natural language, from a database, a cultural rule for indicating emphasis of words and sub-phrases using a shift from a default text typestyle to an emphasized text typestyle for the detected natural language, wherein the shift occurs for one or more words in a phrase and the phrase is otherwise encoded in the default text typestyle, and wherein the emphasized text typestyle is selected from the group consisting of bolding, underlining, strikethrough and italicization;

finding, using the cultural rule, one or more emphasized words in the results;

assigning confidence scores to each result according to occurrences of found emphasized words relevant to the query;

re-ranking the results according to an initial relevance and according to the confidence scores; and producing, to the user, the re-ranked results.

6. The computer program product as set forth in claim 5 wherein the producing of the results further comprises annotation of the results to reflect the detected emphasized one or more words.

7. The computer program product as set forth in claim 5 wherein the program instructions are further for causing a processor to perform operations comprising:

revising the natural language query to expound on the one or more emphasized words in the results; and performing a deep question and answer search of the corpus using the expounded natural language query.

8. The computer program product as set forth in claim 5 wherein the program instructions are further for causing a processor to perform operations comprising:

subsequent to the presentation of results, receiving at least one user satisfaction indicator regarding the results; and employing the satisfaction indicator in a subsequent search to improve search accuracy relative to preferred and non-preferred past results.

9. The computer program product as set forth in claim 5 wherein the computer program product is in the form of a computer system, and further comprising a computer processor which executes the program instructions embodied by the memory device.

10. A method for improving search results in consideration of emphasized content comprising:

receiving, by a machine logic based question-and-answer (QA) system, a query in a first natural language;

responsive to the receipt of the query, accessing a set of text data and associated font characteristic metadata, with:

(i) the set of text data corresponding to natural language text, and (ii) the associated font characteristic metadata including information indicative of different fonts associated with different portions of the natural language text, wherein the associated font characteristic metadata indicates emphasized font characteristics specific to the first natural language;

responsive to the access of the set of text data and associated font characteristic metadata, performing, by the QA system, a natural language processing (NLP) operation on the set of text data and associated font characteristic metadata to obtain a plurality of query responses, wherein the query responses satisfy the query;

determining, by machine logic, a relevance ranking for each of the query responses based, at least in part, upon the emphasized font characteristics; and producing, by a the QA system, to a data consumer, the query responses according to the relevance rankings.

11. The method of 10 wherein the query responses include a first responsive text portion having associated first font characteristic metadata, and further comprising;

receiving first origin data including information indicative of an origin of the first responsive text portion; and determining, by machine logic, a meaning of one or more fonts indicated by the first font characteristic metadata.

12. The method of 10 wherein the producing comprises communicating to a human user in human understandable form and format.

13. The method of claim 12 further comprising: responsive to the communicating, receiving user input indicative of a level of the human users satisfaction with the relevance ranked responsive text portions; responsive to the user input, adjusting use of font characteristics.

* * * * *